United States Patent Office 3,726,899
Patented Apr. 10, 1973

3,726,899
N,N'-BIS(4-BENZILYL-SUBSTITUTED)
TETRACARBOXYLIC IMIDES
Joseph M. Augl, Sterling, Va., and James V. Duffy, Beltsville, Md., assignors to the United States of America as represented by the Secretary of the Navy
No Drawing. Original application Mar. 26, 1971, Ser. No. 128,524, now Patent No. 3,654,226. Divided and this application Nov. 16, 1971, Ser. No. 199,354
Int. Cl. C07d 27/52
U.S. Cl. 260—326 N
3 Claims

ABSTRACT OF THE DISCLOSURE

Phenylated imide quinoxaline co-polymers consisting essentially of units of the formula wherein X is a direct bond, O, S, SO SO$_2$ or $$-\overset{\text{O}}{\underset{\|}{\text{C}}}-$$

R is m- or p-phenylene and Y is or which are useful as coatings for fibers, graphite precursors, films and laminating materials are prepared by contacting with or This is a division of application Ser. No. 128,524, filed Mar. 26, 1971, now U.S. Pat. No. 3,654,226.

BACKGROUND OF THE INVENTION

This invention relates generally to polymers and more particularly to phenylated imide-quinoxaline copolymers.

Phenylated polyquinoxalines are known and have been disclosed in copending application Ser. No. 876,572, filed Nov. 13, 1969 entitled "Phenylated Polyquinoxalines and Method of Preparation Thereof" by Wolfgang J. Wrasidlo. Phenylated imide-quinoxaline copolymers are also known and have been disclosed in copending application Ser. No. 75,248, filed Sept. 24, 1970, entitled "Phenylated Imide-quinoxaline Copolymers and Method of Their Preparation" by Joseph M. Augl. Such polymers are known to have good oxidative thermal stability. Additionally some of these polymers, even those with a relatively high molecular weight, are very soluble in common organic solvents. Since these polymers can be used as coatings, it is highly desirable that they be easily removed by contacting with common organic solvents so that it is possible to easily inspect or repair materials which have been coated with them. Furthermore, polymer coatings of the prior art often have to be heat cured before they can be used thereby requiring an additional step in order to use them effectively. A continuing search goes on for polymers which do not require a heat cure, which can be used as coatings and which have good oxidative-thermal stability as well as good solubility in common organic solvents.

SUMMARY OF THE INVENTION

Accordingly, one object of this invention is to provide phenylated imide-quinoxaline copolymers.

Another object of this invention is to provide phenylated imide-quinoxaline copolymers which have excellent oxidative-thermal stability.

A still further object of the instant invention is to provide phenylated imide-quinoxaline copolymers which can be used as high temperature protective coatings for fibers, graphite precursors, films and laminating materials.

Yet another object of the present invention is to provide a phenylated imide-quinoxaline copolymer which requires no heat cure before use because of imide ring formation prior to polymerization.

A further object of this invention is to provide starting materials from which the phenylated imide-quinoxaline copolymers of this invention can be prepared.

These and other objects of this invention are accomplished by providing copolymers consisting essentially of units of the formula wherein X is selected from the group consisting of a direct bond, O, S, SO, SO$_2$ and $$-\underset{\underset{O}{\|}}{C}-$$

R is selected from the group consisting of m- and p-phenylene and Y is selected from the group consisting of

[structure: diphenyl ketone bridge] and [structure: o-phenylene]

which are prepared by contacting

[structure II: H$_2$N-aryl-X-aryl-NH$_2$ tetraamine]

II with

[structure III: bis-phenylglyoxalyl compound with imide-Y bridge]

III when R is p-phenylene and with

[structure IV: analogous compound]

IV when R is m-phenylene.

DESCRIPTION OF THE PREFERRED EMBODIMENT

The phenylated imide-quinoxaline copolymers of this invention are prepared by reacting compounds of Formula II with compounds of Formula III when R is to be p-phenylene and with compounds of Formula IV when R is to be m-phenylene. The reaction sequence that is used to prepare compounds of Formula III is depicted as follows:

O$_2$N—⟨phenyl⟩—CH$_2$—C(=O)—⟨phenyl⟩ ⟶

H$_2$N—⟨phenyl⟩—CH$_2$—C(=O)—⟨phenyl⟩    V    $\xrightarrow{Ac_2O}$

AcNH—⟨phenyl⟩—CH$_2$—C(=O)—⟨phenyl⟩    VI    $\xrightarrow{SeO_2}$

AcNH—⟨phenyl⟩—C(=O)—C(=O)—⟨phenyl⟩    VII    $\xrightarrow{HCl}$

H$_2$N—⟨phenyl⟩—C(=O)—C(=O)—⟨phenyl⟩    VIII +

[dianhydride structure] IX ⟶ III

When compounds of Formula IV are desired the reaction sequence is identical except that

[structure: m-nitrodeoxybenzoin]

is the initial starting material. The first step in the sequence is the reduction of the nitro group to the amino group by any of the conventional reduction techniques, such as, for example, treatment with iron in an acid solution, to obtain V. The amino compound obtained is then acylated by reaction with acetic anhydride in the conventional manner to obtain VI. Once acylated the compound is treated with selenium dioxide to oxidize the methylene group to a carbonyl to obtain VII. To form the amino analogue VIII, VII is treated with an acid. VIII is then converted to III by reaction with a compound of Formula IX.

The polymer is prepared by reacting in a solvent, such as m-cresol, the tetraamine of Formula II with the compounds of Formula III or IV. This reaction may be conducted entirely at room temperature or at a somewhat elevated temperature. It is desirable, though not necessary, to raise the temperature to above 100° C. for a few minutes at the end of the reaction in order to drive out the water that has formed during the reaction.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

4′-aminodeoxybenzoin

H$_2$N—⟨phenyl⟩—CH$_2$—C(=O)—⟨phenyl⟩

A mixture of 64.0 g. of 4′-nitrodeoxybenzoin, 40.0 g. of iron powder, 3.5 ml. of concentrated hydrochloric acid, 500 ml. of ethanol, and 250 ml. of water was refluxed for one hour. The hot solution was filtered and the filtrate was poured into 1.5 liters of water, giving a slight yellow precipitate, M.P. 95–7° C.

EXAMPLE 2

4′-acetamidodeoxybenzoin

AcNH—⟨phenyl⟩—CH$_2$—C(=O)—⟨phenyl⟩

A mixture of 20.0 g. of 4′-aminodeoxybenzoin, 50 ml. of glacial acetic acid, and 50 ml. of acetic anhydride was heated at reflux for two hours. The solution was then poured into one liter of water, giving a white solid which was recrystallized from a mixture of ethanol-water (1:1), M.P. 158–160° C.

EXAMPLE 3

4-acetamidobenzil

AcNH—⟨phenyl⟩—C(=O)—C(=O)—⟨phenyl⟩

A mixture of 18.0 g. of 4′-acetamidodeoxybenzoin, 8.5 g. of selenium dioxide, and 200 ml. of glacial acetic acid was heated at reflux for two hours and then filtered. Then the mixture was poured into one liter of water. The yield of 4-acetamidobenzil monohydrate was 20.0 g. After two recrystallizations from benzene, the solid was dehydrated, M.P. 136–8° C.

EXAMPLE 4

4-aminobenzil

H$_2$N—⟨phenyl⟩—C(=O)—C(=O)—⟨phenyl⟩

A mixture of 4-acetamidobenzil (15.0 g.) and 150 ml. of concentrated hydrochloric acid was refluxed for four hours. The solid was filtered and made basic with sodium hydroxide to obtain the free base. The precipitated solid was recrystallized from ethanol-water (1:1) to give 12.1 g. of 4-aminobenzil, a pale yellow solid, M.P. 127–9° C.

EXAMPLE 5

N,N'-bis(4-benzilyl)-3,3',4,4'-benzophenone-tetracarboxylimide

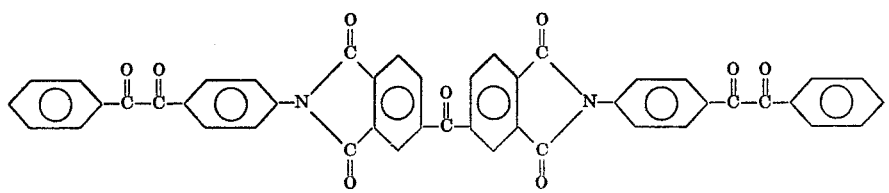

A mixture of 4-aminobenzil, 2.87 g. of 3,3',4,4'-benzophenonetetracarboxylic dianhydride and 50 ml. of dimethylacetamide was stirred under nitrogen for 16 hours at room temperature. At this point, 8 ml. of acetic anhydride and 2 ml. of pyridine were added, and the mixture was then refluxed for 8 hours. After the first 5 hours of reflux, 2 ml. more of pyridine were added. A light yellow solid precipitated which was filtered and washed with a 1:1 mixture of hexane-acetone. The yield was 4.0, g., M.P. 280–1° C.

EXAMPLE 6

N,N'-bis(4-benzilyl)tetrahydrofurantetracarboxylamide

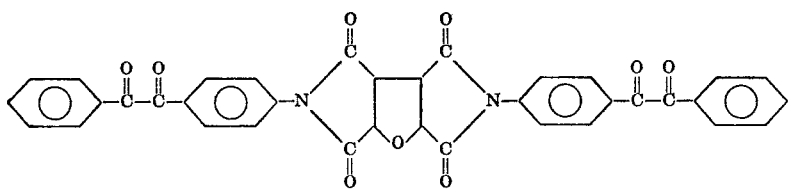

A mixture of 4.0 g. of 4-aminobenzil, 1.89 g. of tetrahydrofurantetracarboxylic dianhydride was stirred under nitrogen for 16 hours at room temperature. A total of 8 ml. of acetic anhydride and 2 ml. of pyridine were then added and the temperature was maintained at 75–80° C. for a period of 4 hours. After cooling, the solution was poured into 400 ml. of water to give a bright lemon yellow colored solid. Yield 2.0 g., M.P. 279–80° C.

EXAMPLE 7

All the polymers of this invention listed in the following table were prepared in the same manner. Equimolar amounts of the appropriate constituents, preferably about 0.001 mole of each, were stirred under nitrogen in m-cresol. In all cases a 10% by weight solution was used. The temperature was kept between 90–100° C. for from 2 to 3 hours. In actual practice the reaction is almost complete in about ½ hour but it is best to heat for a longer period of time to affect complete conversion. During the last 15 minutes the temperature was raised to reflux. The characteristics of some of the polymers prepared in this manner are given in the table.

| | Polymer of Formula I wherein X, R, and Y are— | | | Inherent[a] viscosity, dl./g. | Polymer[b] decomposition temperature, ° C. |
|---|---|---|---|---|---|
| | X | R | Y | | |
| 1 | Direct bond | p-Phenylene | ⟨O⟩–C(O)–⟨O⟩ | 1.54 | 530 |
| 2 | –C(O)– | do | Same as above | 0.78 | 525 |
| 3 | SO$_2$ | do | do | 0.62 | 490 |
| 4 | O | do | do | 1.09 | 515 |
| 5 | Direct bond | do | ⟨O⟩ (furan) | 2.07 | 290 |
| 6 | –C(O)– | do | Same as above | 1.02 | 310 |
| 7 | SO$_2$ | do | do | 1.24 | 300 |
| 8 | O | do | do | 2.11 | 320 |

[a] Determined as a 0.5 g. in 100 ml. m-cresol solution at 30° C.
[b] Determined from TGA data in vacuum at a heating rate of 5° C. per minute.

The polymers of this invention have an inherent viscosity of between about 0.4 and 3.0 dl./g. in m-cresol (0.5 g. in 100 ml. at 30° C.). For laminate coatings a viscosity of between about 0.4–0.9 is preferred while for films and fibers a viscosity as high as possible is preferred. To obtain the relatively high viscosities, it is only necessary to use very pure materials. These copolymers are also relatively soluble in solvents such as m-cresol, m-methoxyphenol, tetrachloroethane, chloroform, dimethylacetamide, N-methylpyrrolidone, hexafluoroacetone, hexafluoroisopropanol, nitrobenzene, and pyridine.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A compound of the formula

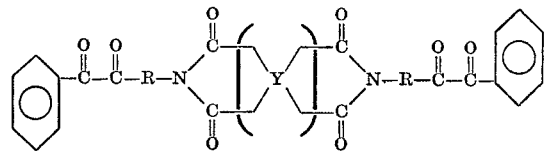

wherein R is selected from the group consisting of m and p-phenylene and Y is selected from the group consisting of

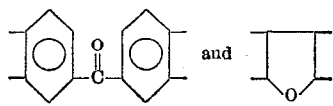

2. A compound according to claim 1 wherein R is p-phenylene and Y is

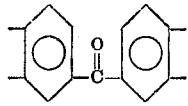

3. A compound according to claim 1 wherein R is p-phenylene and Y is

References Cited
UNITED STATES PATENTS 3,275,651   9/1966   Ellis et al. _____ 260—326 N JOSEPH A. NARCAVAGE, Primary Examiner U.S. Cl. X.R.
260—326.3